United States Patent
Herve et al.

(10) Patent No.: US 11,386,594 B2
(45) Date of Patent: Jul. 12, 2022

(54) HOLOGRAPHIC RECONSTRUCTION METHOD

(71) Applicant: Commissariat a l'energie atomique et aux energies alternatives, Paris (FR)

(72) Inventors: Lionel Herve, Grenoble (FR); Cedric Allier, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 150 days.

(21) Appl. No.: 16/907,407

(22) Filed: Jun. 22, 2020

(65) Prior Publication Data
US 2020/0402273 A1     Dec. 24, 2020

(30) Foreign Application Priority Data
Jun. 22, 2019  (FR) ..................... 19 06766

(51) Int. Cl.
| | | |
|---|---|---|
| *G06T 11/00* | (2006.01) | |
| *G03H 1/00* | (2006.01) | |
| *G03H 1/04* | (2006.01) | |

(Continued)

(52) U.S. Cl.
CPC ......... *G06T 11/006* (2013.01); *G03H 1/0005* (2013.01); *G03H 1/0443* (2013.01);
(Continued)

(58) Field of Classification Search
CPC ....... G01N 15/1468; G01N 2015/1454; G03H 1/0005; G03H 1/0443; G03H 1/0866;
(Continued)

(56) References Cited

U.S. PATENT DOCUMENTS

2017/0059468 A1    3/2017  Yevick et al.

FOREIGN PATENT DOCUMENTS

| WO | WO 2018/060589 A1 | 4/2018 | |
|---|---|---|---|
| WO | WO-2018060589 A1 * | 4/2018 | ......... G01N 15/1434 |

OTHER PUBLICATIONS

French Preliminary Search Report dated Feb. 13, 2020 in French Application 19 06766 filed Jun. 22, 2019 (with Written Opinion & English Translation of Categories of Cited Documents), 12 pages (Continued)

*Primary Examiner* — Dakshesh D Parikh
(74) *Attorney, Agent, or Firm* — Oblon, McClelland, Maier & Neustadt, L.L.P.

(57) ABSTRACT

A method for observing a sample, the sample lying in a sample plane defining radial positions, parameters of the sample being defined at each radial position, the method comprising:
a) illuminating the sample using a light source, emitting an incident light wave that propagates toward the sample;
b) acquiring, using an image sensor, an image of the sample, said image being formed in a detection plane, the sample being placed between the light source and the image sensor;
c) processing the image acquired by the image sensor, so as to obtain an image of the sample, the image of the sample corresponding to a distribution of at least one parameter of the sample describing the sample in the sample plane;
wherein the processing of the acquired image comprises implementing an iterative method, followed by applying a supervised machine learning algorithm, so as to obtain an initialization image intended to initialize the iterative method.

15 Claims, 14 Drawing Sheets

(51) Int. Cl.
*G06K 9/62* (2022.01)
*G06V 20/69* (2022.01)

(52) U.S. Cl.
CPC .......... *G06K 9/6262* (2013.01); *G06T 11/005* (2013.01); *G06V 20/693* (2022.01); *G03H 2001/005* (2013.01); *G03H 2001/0452* (2013.01); *G03H 2210/55* (2013.01); *G06T 2211/424* (2013.01)

(58) Field of Classification Search
CPC ..... G03H 2001/005; G03H 2001/0447; G03H 2001/0452; G03H 2001/0816; G03H 2001/0875; G03H 2210/55; G06K 9/6262; G06N 20/10; G06N 3/0454; G06N 3/08; G06T 11/005; G06T 11/006; G06T 2211/424; G06V 20/693
See application file for complete search history.

(56) References Cited

OTHER PUBLICATIONS

Shimobaba, T. et al., "Convolutional neural network-based regression for depth prediction in digital holography," arxiv.org, arXiv:1802.00664v1 [cs.CV], Feb. 2, 2018, 4 pages.
Yevick, A. et al., "Machine-learning approach to holographic particle characterization," Optics Express, vol. 22, No. 22, Oct. 22, 20014, XP055298737, 7 pages.
Wu, Y. et al., "Extended depth-of-field in holographic image reconstruction using deep learning based auto-focusing and phase-recovery," arxiv.org, Mar. 21, 2018, XP081224518, 9 pages.

* cited by examiner

HOLOGRAPHIC RECONSTRUCTION METHOD

TECHNICAL FIELD

The technical field of the invention is the reconstruction of holographic images, in particular with a view to characterizing a sample, for example a biological sample.

PRIOR ART

The observation of samples, and in particular biological samples, by lensless imaging has seen substantial development over the last ten years. This technique allows a sample to be observed by placing it between a light source and an image sensor, without placing any optically magnifying lenses between the sample and the image sensor. Thus, the image sensor collects an image of the light wave transmitted by the sample.

This image is formed of interference patterns generated by interference between the light wave emitted by the light source and transmitted by the sample, and diffracted waves resulting from the diffraction, by the sample, of the light wave emitted by the light source. These interference patterns are sometimes called diffraction patterns.

Document WO2008090330 describes a device allowing biological samples, in fact cells, to be observed by lensless imaging. The device allows an interference pattern, the morphology of which allows the type of cell to be identified, to be associated with each cell. Lensless imaging would thus appear to be a simple and inexpensive alternative to a conventional microscope. In addition, its field of observation is clearly much larger than it is possible for that of a microscope to be. It will thus be understood that the prospective applications related to this technology are many and various.

In order to obtain a satisfactory observation of the sample, iterative image-reconstruction algorithms have been developed, such as those described in WO2016189257 or in WO2017162985. These algorithms comprise iteratively applying a holographic propagation operator, so as to propagate the hologram formed in the detection plane to a reconstruction plane, the latter generally corresponding to a sample plane, i.e. the plane in which the sample lies. The sample plane is generally parallel to the detection plane. The algorithms described in the prior art successively propagate/back-propagate images between the detection plane and the sample plane. Specifically, the image acquired by the image sensor contains no information relating to the phase of the exposure light wave. The objective of these algorithms is to estimate, iteratively, the phase of the exposure light wave in the detection plane. This allows a correct image of the sample in the reconstruction plane to be formed. Thus, these algorithms allow optical properties of the exposure light wave to be obtained. It may for example be a question of the modulus or phase.

The inventors propose a method for observing a sample using a holographic imaging method, the method comprising a step of reconstructing a complex image of the sample, on the basis of which image it is possible to obtain a spatial representation of parameters of the sample.

SUMMARY OF THE INVENTION

A first subject of the invention is a method for observing a sample, the sample lying in a sample plane defining radial positions, parameters of the sample being defined at each radial position, the method comprising:
  a) illuminating the sample using a light source, configured to emit an incident light wave that propagates toward the sample;
  b) acquiring, using an image sensor, an image of the sample, said image being formed in a detection plane, the sample being placed between the light source and the image sensor;
  c) from the image acquired by the image sensor, obtaining an image of the sample corresponding to a distribution of at least one parameter of the sample in the sample plane;
the method being such that step c) comprises the following steps:
  (i) taking into account an initialization image;
  (ii) applying a holographic propagation operator to the initialization image, or to a complex image of the sample resulting from step (v) of a preceding iteration, so as to estimate an image in the detection plane, for example the image acquired by the image sensor in the detection plane;
  (iii) comparing the image acquired in step b) and the image estimated in step ii);
  (iv) depending on the comparison, updating the parameters describing the sample;
  (v) provided that a convergence criterion has not been met or a preset number of iterations has not been reached, updating a complex image of the sample, in the sample plane, using the parameters updated in step iv), then reiterating steps (ii) to (v);
  (vi) using parameters of the sample, resulting from the last step (iv) performed (i.e. the last step (iv) before step (vi)), to feed a supervised machine learning algorithm, so as to update parameters of the sample;
  (vii) using the parameters resulting from step (vi) to update the initialization image;
  (viii) reiterating, at least once, steps (ii) to (v), using, during the first reiteration, the initialization image updated in step (vii);
  (ix) obtaining an image of the sample from the parameters updated in step iv) of the last iteration of steps (ii) to (v).

Step (iv) may comprise computing a validity indicator, such that the parameters of the sample are updated so as to make the validity indicator tend toward a preset value. In step iv), the parameters of the sample are then updated so as to minimize the validity indicator.

By complex image of the sample, what is meant is a complex image of an exposure light wave, in the sample plane, the exposure light wave propagating to the image sensor.

The supervised machine learning algorithm may for example employ a neural network. The neural network may notably be a convolutional neural network.

Step iv) may comprise determining a gradient of the validity indicator as a function of at least one parameter, such that the parameters are updated to decrease the validity indicator of the following iteration. Step iv) may notably employ a gradient descent algorithm.

According to one embodiment:
  step iv) results in the determination of an image of each parameter in the sample plane;
  and/or, in step vi), at least one image of a parameter forms an input layer of the supervised machine learning algorithm;

and/or, in step viii), the supervised machine learning algorithm delivers an output image, corresponding to an image of a parameter of the sample updated by the algorithm.

By image of a parameter, what is meant is a spatial distribution of the parameter in the sample plane.

According to one embodiment, in step (ii), the computation of the image of the sample in the detection plane comprises a convolution using a convolution kernel, the convolution kernel representing a spatial extent of the light source.

According to one embodiment, the parameters describing the sample comprise:
- a first parameter, representing an absorbance of the sample;
- a second parameter, representing an optical path difference, along the propagation axis of the incident light wave.

According to one embodiment, in step (vi), the supervised machine learning algorithm is fed with:
- an image of the first parameter, corresponding to a spatial distribution of the first parameter, which is updated in the last iteration of steps (ii) to (v) preceding step (vi);
- an image of the second parameter, corresponding to a spatial distribution of the second parameter, which is updated in the last iteration of steps (ii) to (v) preceding step (vi).

The supervised machine learning algorithm then allows an image of the updated second parameter to be obtained.

According to one embodiment, following a step (viii), steps (vi) to (viii) are repeated at least once, or even at least twice. Thus, following each step (viii), a series of iterations of steps (ii) to (v) is performed. After each series of iterations:
- either steps (vi) to (viii) are repeated, prior to another series of iterations of steps (ii) to (v);
- or step (ix) is implemented.

According to one embodiment, no image-forming optics are placed between the sample and the image sensor.

According to one embodiment, an optical system, such as a lens or objective, is placed between the sample and the image sensor, the optical system defining an image plane and an object plane, the method being such that, in step b):
- the object plane is offset from the sample plane by an object defocus distance;
- and/or the image plane is offset from the detection plane by an image defocus distance.

The method may comprise:
d) characterizing the sample on the basis of the image of the sample resulting from step c), or on the basis of each image of the sample resulting from step c).

A second subject of the invention is a device for observing a sample, comprising:
- a light source, configured to emit an incident light wave in order to illuminate the sample;
- a sample holder, configured to receive the sample;
- an image sensor, configured to acquire an image of the sample when the sample is placed on the sample holder;
- a processor, programmed to execute instructions allowing steps i) to viii) or i) to ix) of a method according to the first subject of the invention to be implemented on the basis of an image acquired by the image sensor.

The invention will be better understood on reading the description of examples of embodiments, which are presented, in the rest of the description, with reference to the figures listed below.

FIGURES

Figure 3A:
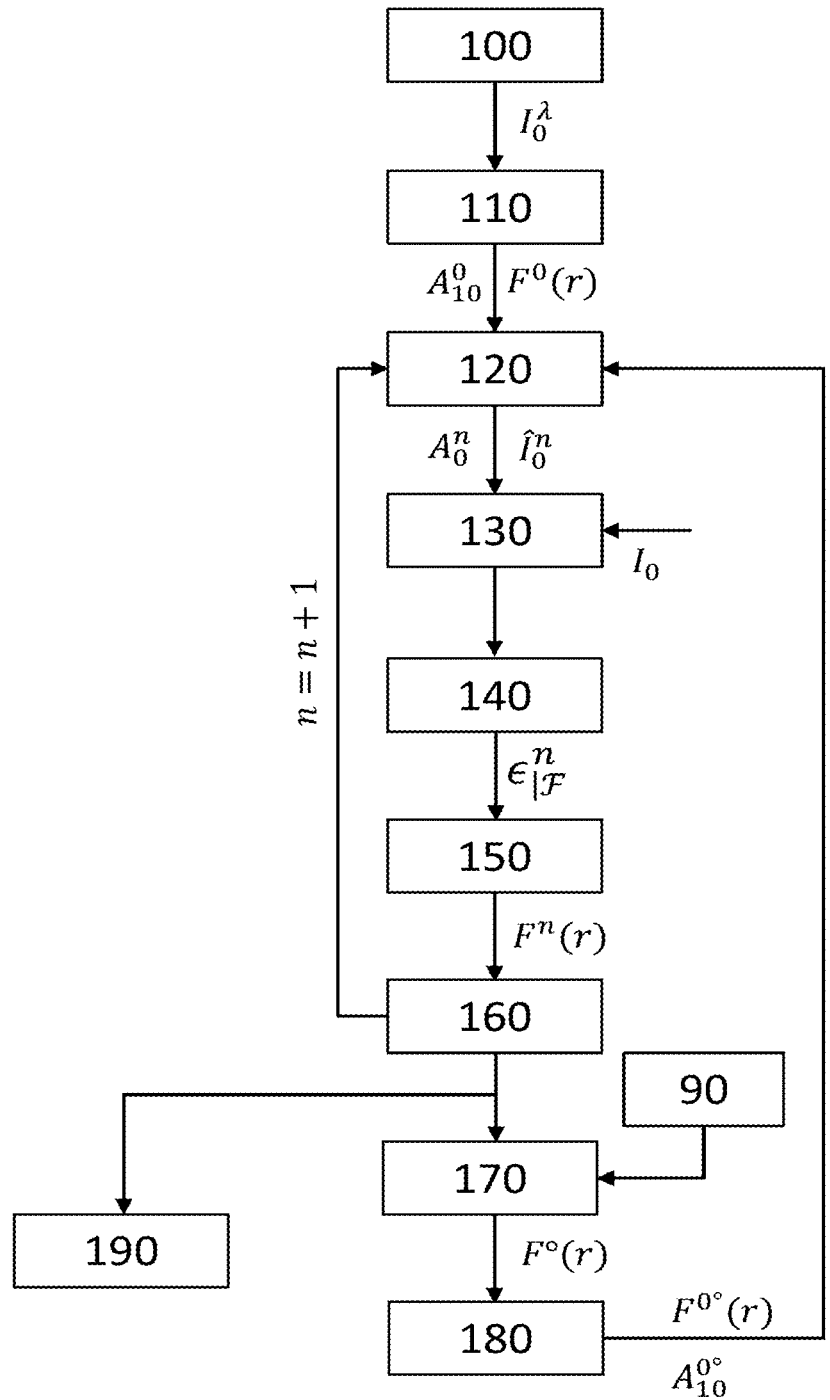
FIG. 3A shows the main steps of one embodiment of the invention.
Figure 3B:
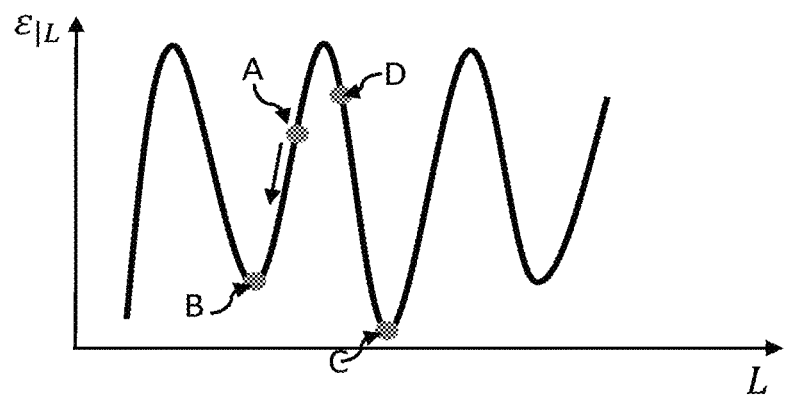
FIG. 3B illustrates an indeterminateness of an optical property of the sample.
Figure 3C:
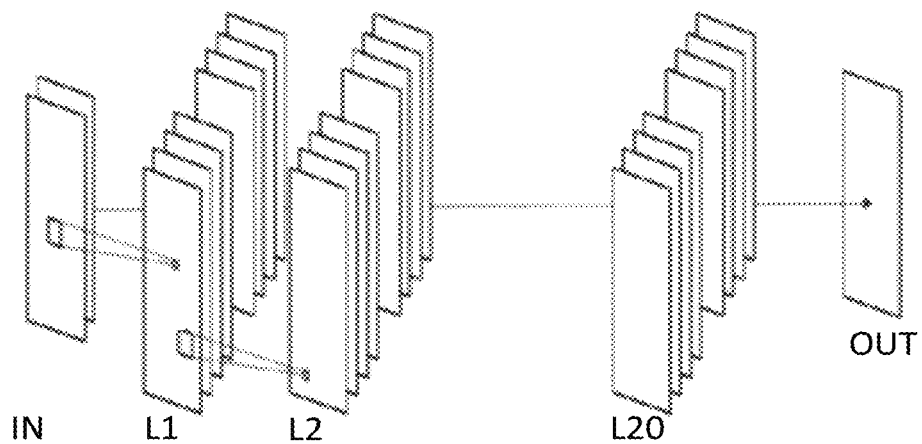

FIG. 3C schematically shows a convolutional neural network used in the invention.

FIGS. 4A to 4G show images illustrating the training the neural network using a modeled sample.

FIGS. 5A to 5F show an example of application of the invention to a sample containing floating cells.

FIGS. 6A to 6D show another example of application of the invention to a sample containing floating cells.

Figure 7A:
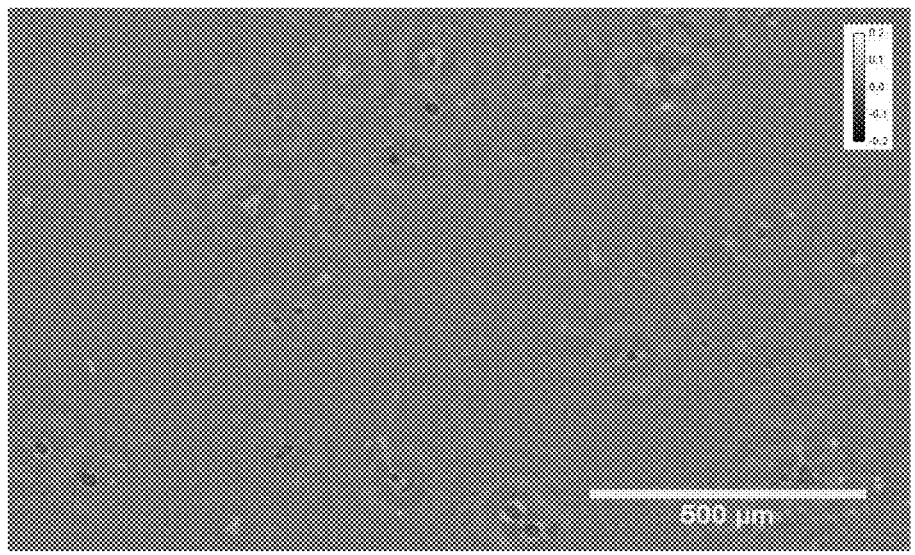
Figure 7B:
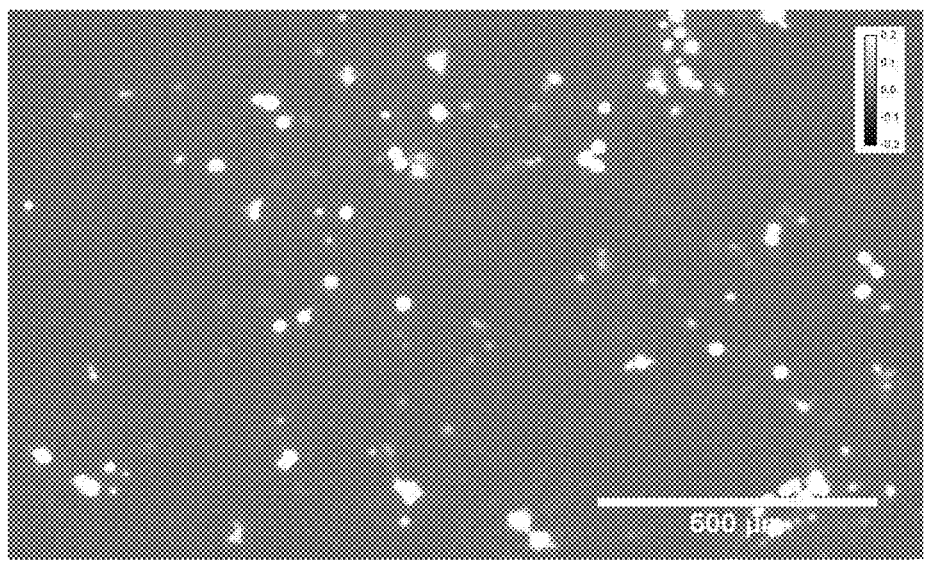
Figure 7C:
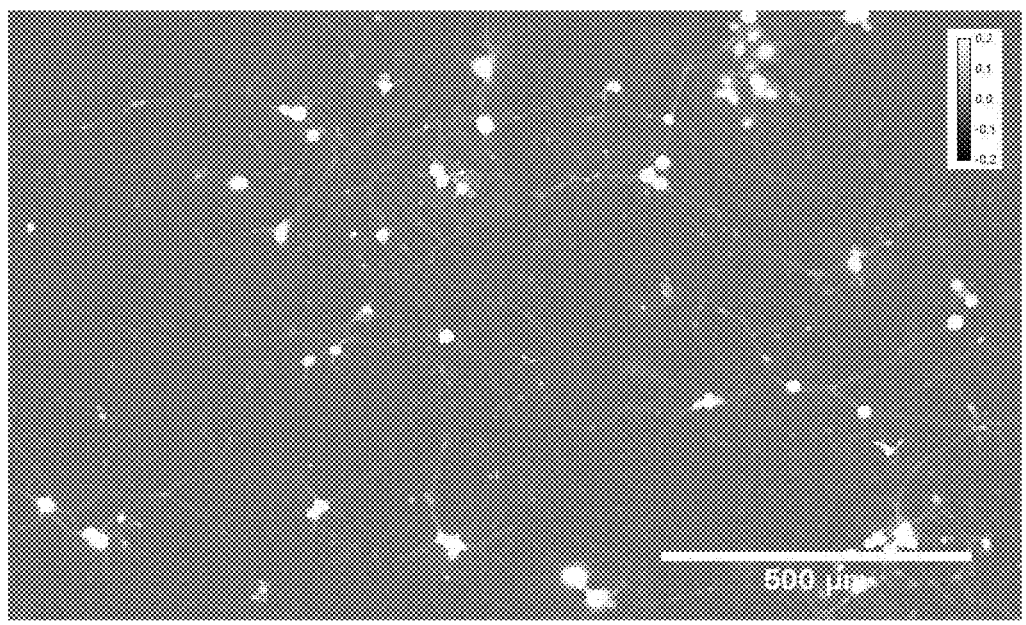

FIGS. 7A to 7C show an example of application of the invention to a sample containing adherent cells.

DESCRIPTION OF PARTICULAR EMBODIMENTS

Figure 1A:
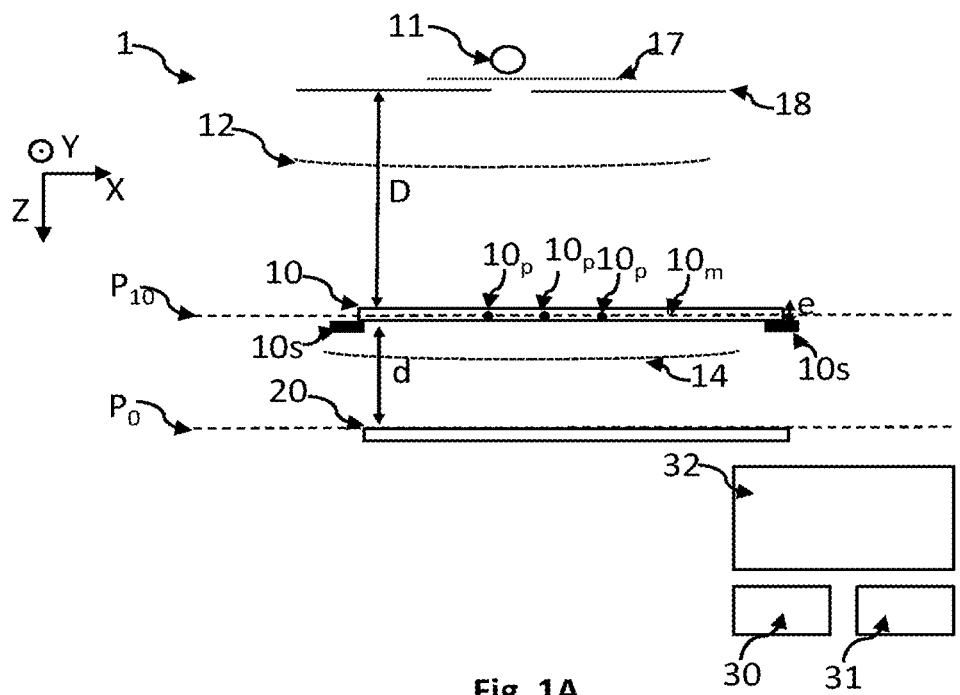
FIG. 1A shows a device allowing the invention to be implemented, in a lensless imaging configuration.

FIG. 1A shows an example of a device 1 according to the invention. A light source 11 is configured to emit a light wave 12, called the incident light wave, which propagates in the direction of a sample 10, along a propagation axis Z. The light wave is emitted in a spectral band $\Delta\lambda$, comprising a wavelength $\lambda$. The wavelength $\lambda$ may be a central wavelength of said spectral band.

The sample 10 is a sample that it is desired to characterize. It may notably be a question of a medium $10_m$ containing particles $10_p$. The particles $10_p$ may be blood particles, for example red blood cells. It may also be a question of cells, microorganisms, for example bacteria or yeast, micro-algae, micro-spheres, or droplets that are insoluble in the liquid medium, for example lipid nanoparticles. Preferably, the particles $10_p$ have a diameter, or are inscribed in a diameter, smaller than 1 mm, and preferably smaller than 100 µm. It is a question of microparticles (diameter smaller than 1 mm) or of nanoparticles (diameter smaller than 1 µm). The medium $10_m$, in which the particles bathe, may be a liquid medium, for example a liquid phase of a bodily fluid, a culture medium or a liquid sampled from the environment or from an industrial process. It may also be a question of a solid medium or a medium having the consistency of a gel, for example an agar substrate, which is propitious to the growth of bacterial colonies.

The sample may also be a solid sample, for example a thin slice of biological tissue, such as a pathology slide, or a dry extract of a fluid, for example of a biological fluid.

The sample is preferably transparent or sufficiently translucent to be able to allow an image to be formed with the image sensor.

The sample 10 may be contained in a fluidic chamber 16, for example a micro-cuvette, commonly used in point-of-care-type devices, into which the sample 10 penetrates, for example by capillary action. The thickness e of the sample 10, along the propagation axis, typically varies between 20 µm and 1 cm, and is preferably comprised between 50 µm and 500 µm, for example is 150 µm.

The sample lies in a plane $P_{10}$, called the sample plane, perpendicular to the propagation axis. It is held on a holder 10s. The sample plane is defined by two orthogonal axes X and Y, respectively defining coordinates x and y. Each pair of coordinates (x,y) corresponds to one radial position r. The radial positions are defined in the sample plane and in a detection plane that is described below.

The distance D between the light source 11 and the sample 10 is preferably larger than 1 cm. It is preferably comprised between 2 and 30 cm. Preferably, the light source, seen by the sample, may be considered to be point-like. This means that its diameter (or its diagonal) is preferably smaller than one tenth, better still one hundredth, of the distance between the sample and the light source. Thus, preferably, the light reaches the sample in the form of plane waves, or waves that may be considered as such.

The light source 11 may be a light-emitting diode or a laser diode. It may be associated with diaphragm 18, or spatial filter. The aperture of the diaphragm is typically comprised between 5 µm and 1 mm, preferably between 10 µm and 200 µm or 500 µm.

In this example, the diaphragm is that supplied by Thorlabs under the reference P150S and its diameter is 150 µm. The diaphragm may be replaced by an optical fiber, a first end of which is placed facing the light source 11 and a second end of which is placed facing the sample 10.

The device may comprise a diffuser 17, placed between the light source 11 and the diaphragm 18. The use of such a diffuser allows constraints on the centrality of the light source 11 with respect to the aperture of the diaphragm 18 to be relaxed. The function of such a diffuser is to distribute the light beam, produced by the elementary light source 11, in a cone of angle α, α being equal to 30° in the present case. Preferably, the scattering angle α varies between 10° and 80°.

Preferably, the emission spectral band Δλ, of the incident light wave 12 has a width smaller than 100 nm. By spectral bandwidth, what is meant is a fullwidth at half maximum of said spectral band. In the rest of the text, the spectral band is designated by a wavelength λ representative of the spectral band, and corresponding for example to the central wavelength.

The sample 10 is placed between the light source 11 and an image sensor 20. The image sensor 20 defines a detection plane $P_0$. The latter preferably lies parallel, or substantially parallel, to the sample plane $P_{10}$ in which the sample lies. The term substantially parallel means that the two elements may not be rigorously parallel, an angular tolerance of a few degrees, smaller than 20° or 10°, being acceptable.

The image sensor 20 is configured to form an image in the detection plane $P_0$. In the example shown, it is a question of a CCD or CMOS image sensor comprising a matrix array of pixels. CMOS sensors are the preferred sensors because the size of the pixels is smaller, this allowing images, the spatial resolution of which is more favorable, to be acquired. The detection plane $P_0$ preferably lies perpendicular to the propagation axis Z of the incident light wave 12. Thus, the detection plane $P_0$ is parallel to the plane $P_{10}$ of the sample. The image sensor comprises pixels, one radial position r being associated with each pixel, in the detection plane $P_0$.

The distance d between the sample 10 and the matrix array of pixels of the image sensor 20 is preferably comprised between 50 µm and 2 cm, and more preferably comprised between 100 µm and 2 mm.

In the device shown in FIG. 1A, the absence of magnifying or image-forming optics between the image sensor 20 and the sample 10 will be noted. This does not prevent focusing micro-lenses optionally being present level with each pixel of the image sensor 20, said micro-lenses not having the function of magnifying the image acquired by the image sensor.

Under the effect of the incident light wave 12, the sample 10 may generate a diffracted wave, liable to produce, in the detection plane $P_0$, interference, in particular with a portion of the incident light wave 12 transmitted by the sample. Moreover, the sample may absorb one portion of the incident light wave 12. Thus, the light wave 14, transmitted by the sample, and to which the image sensor 20 is exposed, is formed following absorption and diffraction of the incident light wave 12 by the sample. Thus, the sample results in absorption of one portion of the incident light wave, and in a phase shift of the latter. The phase shift is due to a variation in refractive index (or optical index) when the light propagates through the sample.

The light wave 14 may also be designated by the term exposure light wave. A processor 30, for example a microprocessor, is configured to process each image acquired by the image sensor 20. In particular, the processor is a microprocessor connected to a programmable memory 31 in which a sequence of instructions for carrying out the image-processing and computing operations described in this description is stored. The processor may be coupled to a screen 32 allowing images acquired by the image sensor 20 or computed by the processor 30 to be displayed.

The image acquired by the image sensor forms a hologram. It generally does not allow a satisfactory visual representation of the sample, in particular when the sample comprises diffracting elements that are very close to one another. This is notably the case when the sample contains particles that are very close to one another, or when the sample is a thin slice of biological tissue.

Figure 1B:
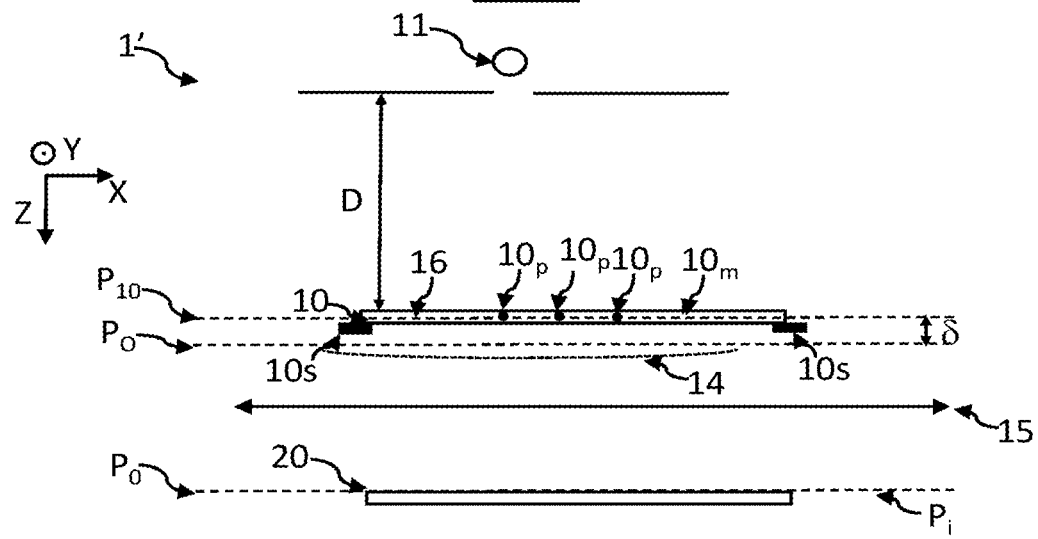
FIG. 1B shows another device allowing the invention to be implemented, in a defocused configuration.

FIG. 1B schematically shows another device 1' allowing the invention to be implemented. Contrary to the device shown in FIG. 1A, the device of FIG. 1B comprises an image-forming optical system 15. The optical system 15 defines an image plane $P_i$ and an object plane $P_0$. The optical system may be a lens or an objective. During the acquisition of the image of the sample, the image sensor is placed in a defocused configuration. The detection plane is offset with respect to the image plane and/or the sample plane lies is offset with respect to the object plane. The offset δ is generally small, preferably being smaller than 1 mm, and typically lying in a range of 50 µm-500 µm.

Whatever the device used, the sample may be described by sample parameters. One or more sample parameters corresponds to each radial position. The parameters corresponding to a given radial position may form a vector F(r), each vector being defined at a radial position r in the sample plane. Each term of each vector corresponds to one parameter of the sample at the radial position r. Each radial position corresponds to one or more pixels of the image sensor.

Each vector of parameters F(r) is of dimension W. W is a strictly positive integer. W corresponds to the number of parameters considered at each radial position. Each vector F(r) contains W terms $F_w(r)$, such that:

$$F(r) = \begin{bmatrix} F_1(r) \\ F_w(r) \\ F_W(r) \end{bmatrix}$$

All of the vectors F(r), for the various radial positions considered, together form a set of parameters $\mathcal{F}$ collating the parameters of the sample.

The following is based on the example described in patent application FR1859618, in which the sample may be described by an absorbance α(r) (first term of the vector) and an optical path difference L(r) (second term of the vector), these properties being liable to vary depending on the illumination spectral band. Thus, at each radial position r, the sample may be described by W=2 different parameters:

$$F_{w=1}(r) = F_1(r) = \alpha(r)$$

and $$F_{w=2}(r) = F_2(r) = L(r).$$

The absorbance α(r) corresponds to an ability of the sample to absorb all or a portion of the illumination light wave. When a particle is considered to be transparent, α(r)=0.

In other models, the parameters may be the optical index, i.e. the refractive index, of the sample, given that it may be a complex quantity. Thus, the parameters may comprise the real part of the refractive index, and/or the imaginary part of the refractive index.

The optical path difference L(r) depends on the thickness e(r) of the sample, parallel to the propagation axis of the light, and on the index difference induced by the sample. For example, when the sample comprises particles $10_p$ bathing in a medium $10_m$, each particle $10p$ induces an optical path difference L(r) such that:

$$L(r) = (n_p - n_m) \times e(r)$$

where e(r) is the thickness of the particle at the radial position r; and $n_p$ and $n_m$ correspond to the refractive indices of the particle $10_p$ and of the medium $10_m$, respectively.

Figure 2:
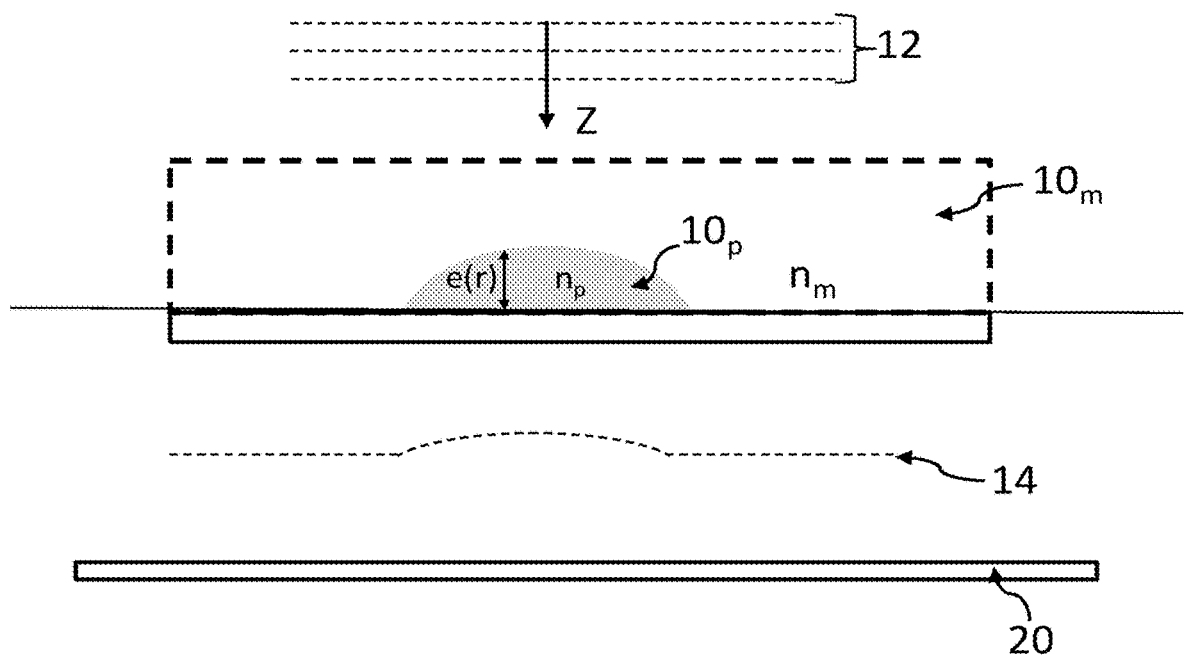
FIG. 2 shows the evolution of a light wave and illustrates the delay induced by an optical path difference in the sample. The delay generates a phase shift in the light wave propagating between a sample and the image sensor.

In FIG. 2, the wave front of the light wave 12 incident on the sample, and of the exposure light wave 14 to which the image sensor 20 is exposed, the exposure light wave propagating from the sample to the image sensor, have been represented by dashed lines. In this example, $n_p > n_m$. The wave front is plane before reaching the sample. Downstream of the sample, the wave front is deformed because of the appearance of optical path differences induced by the particle.

Let $A_{10}$ be the image of the complex amplitude of the exposure light wave 14 in the plane $P_{10}$ of the sample. This image, which is a complex image, may also be considered to be a complex image of the sample. At each radial position r, the complex amplitude $A_{10}(r)$ may be defined from the vector of parameters F(r) corresponding to the radial position r. When the vector of parameters F(r) contains the terms α(r) and L(r), the complex amplitude $A_{10}(r)$ may be expressed by the following expression:

$$A_{10}(r) = b(r) \exp\left(2i\pi \frac{L(r)}{\lambda} + \alpha(r)\right) \quad (1)$$

The term b(r) is an amplitude representative of the incident light wave 12 reaching the sample. This amplitude may be measured by the image sensor 20 in the absence of sample 10 on the holder 10s. The light source 11 then directly illuminates the image sensor. From the image $I_{0,b}(r)$ acquired by the image sensor 20 in the emission spectral band Δλ, the amplitude b(r) is for example obtained using the expression:

$$b(r) = \sqrt{I_{0,b}(r)}. \quad (1')$$

Expression (1) allows an expression for a complex image to be determined from the vectors of parameters determined in the various radial positions.

The term $$2i\pi \frac{L(r)}{\lambda}$$

determines the phase of the complex amplitude $A_{10}(r)$. It may be seen that this term is λ periodic. This means that various particles, the optical path difference of which is equal to L(r)+qλ, q being an integer, cause the same complex amplitude $A_{10}(r)$ between the sample and the image sensor to be obtained. In other words, there are potentially an infinite number of objects capable of generating a given complex amplitude between the sample and the image sensor.

One of the objectives of holographic reconstruction algorithms is to reconstruct the optical properties of an object from an image acquired by an image sensor, forming a hologram. However, the hologram contains only partial information on the exposure light wave, to which the image sensor is exposed. In particular, the image acquired by the image sensor, i.e. the hologram, contains no information on the phase of the exposure light wave. The use of iterative holographic reconstruction algorithms allows information on the phase of the exposure light wave, which information corresponds to the shift in the phase of the incident light wave induced by the object, to be estimated, iteratively. When the exposure light wave is expressed using expression (1), the phase-related term corresponds to the term $$2i\pi \frac{L(r)}{\lambda}.$$

One problem with the estimation of a phase term using current algorithms, which is usually called "phase unwrapping", is that of identifying the correct value of the phase term among the infinite number of λ periodic values that result in the same expression for the complex amplitude of the exposure light wave.

The method described below, the main steps of which are illustrated in FIG. 3A, allows this question to be addressed.

Step 100: illuminating the sample and acquiring an image $I_0$ in each illumination spectral band Δλ.

Step 110: Initialization. In this step, an initialization complex image $A_{10}^0$ is taken into account in the sample plane $P_{10}$. The index 10 of the symbol $A_{10}^0$ designates the fact that the image is acquired in the sample plane $P_{10}$. The exponent 0 of the symbol $A_{10}^0$ designates the fact that it is a question of an initializaiton image.

Considering an exposure light wave such as defined by expression (1), the initialization amounts to considering, for each radial position r, parameters of the sample forming an initial vector of parameters, such that:

$$F^0(r) = \begin{bmatrix} \alpha^0(r) \\ L^0(r) \end{bmatrix}$$

The terms from which the initial vector is composed may be defined arbitrarily, or depending on knowledge of the properties of the sample. For example, it is possible to attribute, to each term, the same value, for example a value of zero. The vectors of parameters $F^0(r)$ defined in this step form an initialization set $\mathcal{F}^0$ describing the sample 10. They also form an initial complex image $A_{10}(r)$ in the sample plane $P_{10}$.

Steps 120 to 160 described below are implemented iteratively, according to an iteration rank n. n is an integer comprised between 1 (first iteration) and N, N corresponding to the number of iterations. In step 110, n=0. In the notations used, the iteration rank is presented in the form of an exponent.

A set $\mathcal{F}^n$ of vectors of parameters $F^n(r)$ is associated with each iteration. Each vector of parameters $F^n(r)$ associated with a radial position r is such that:

$$F^n(r) = \begin{bmatrix} \alpha^n(r) \\ L^n(r) \end{bmatrix}$$

Each iteration amounts to updating the vectors of parameters $F^n(r)$, i.e. the terms $\alpha^n(r)$ and $L^n(r)$, for the various radial positions r in question.

Step 120: Estimating an image in the detection plane.

For each radial position r, from the parameters $F^{n-1}(r)$ resulting from step 110 or step 150 of a preceding iteration, a complex amplitude $A_{10}^{n-1}(r)$ of the exposure light wave 14 in the sample plane $P_{10}$ is determined. In the first iteration, n=1. In this example, the complex amplitude is determined from expression (1), from the initial set $\mathcal{F}^0$ of vectors of parameters or from the set $\mathcal{F}^{n-1}$ of vectors of parameters resulting from a preceding iteration. The complex amplitudes $A_{10}^{1-1}(r)$ defined for the various radial positions r in question form a complex image $A_{10}^{n-1}$ of the exposure light wave 14, in the sample plane $P_{10}$. The complex image $A_{10}^{n-1}$ is also called the complex image of the sample.

Thus, the complex image $A_{10}^{n-1}$ taken into account in step 120 is generated from a initial set $\mathcal{F}^{n-1}$ of parameters (when n=1) or from a set of parameters resulting from a preceding iteration of steps 120 to 150.

A holographic propagation operator $h_{P_{10} \to P_0}$ is applied to the complex image $A_{10}^{n-1}$ so as to obtain a complex image $A_0^n$ of the exposure light wave 14, in the detection plane, according to the expression:

$$A_0^n = A_{10}^{n-1} * h_{P_{10} \to P_0} \quad (2).$$

$h_{P_{10} \to P_0}$ is a holographic propagation operator, allowing the sample plane $P_{10}$ to be propagated to the detection plane $P_0$. This operator is dependent on wavelength $\lambda$. It may be a question of a Fresnel operator, for example $$h(x, y, z) = \frac{1}{i\lambda z} e^{j2\pi \frac{z}{\lambda}} \exp\left(i\pi \frac{x^2 + y^2}{\lambda z}\right), \quad (3)$$

with $r=(x,y)$.

Generally, the holographic propagation operator $h_{P_{10} \to P_0}$ models transport of the exposure light wave 14 between at least two points that are distant from each other. In the described application, the convolution described with reference to equation (2) models transport of the exposure light wave 14 between the sample plane $P_{10}$ and the detection plane $P_0$.

Considering the square of the modulus of the exposure light wave 14, an estimation $\hat{I}_0^n$ of the image $I_0$ acquired by the image sensor is obtained. Thus, $$\hat{I}_0^n = A_0^n A_0^{n*} \quad (4)$$

$A_0^{n*}$ is the conjugated complex image of the complex image $A_0^n$.

Expression (4) amounts to adopting a simple measurement model, in which the magnitude of the estimation of the image acquired by the sensor corresponds to the square of the modulus of the complex image $A_0^n$.

According to one alternative, it is possible to take into account the spatial coherence of the light source, by considering a convolution kernel K, and lighting non-uniformities, such that:

$$\hat{I}_0^n = B[(A_0^n A_0^{n*}) * K] \quad (4')$$

The convolution kernel K expresses an area of the light source parallel to the detection plane.

B may be obtained by calibration, for example via an acquisition in the absence of an object between the source and the image sensor.

Generally, in this step, the estimation $\hat{I}_0^2$ may be described using the following expression:

$$\hat{I}_0^n = m(A_{10}^{n-1}) \quad (5).$$

where $A_{10}^{n-1}$ corresponds to the complex image of the exposure light wave 14 in the sample plane, namely either the initial image (when n=1) or an image resulting from a preceding iteration (when n>1), and m is a function taking into account expression (4) (or (4')) and expression (2).

The complex image $A_{10}^{n-1}$ of the exposure light wave depends on the parameters contained in the vectors $F^{n-1}(r)$ describing the sample, in the present case the absorbance $\alpha^{n-1}(r)$ and the optical path difference $L^{n-1}(r)$, according to expression (1).

Thus, it is possible to write:

$$\hat{I}_0^n = m'(\alpha^{n-1}, L^{n-1}) \quad (5)'$$

where $\alpha^{n-1}$ and $L^{n-1}$ are images of the absorbance and of the optical path difference resulting from the initialization or from a preceding iteration, respectively. m' is a function taking into account expressions (1), (2) and (4) or (4').

Step 130: comparing the image $\hat{I}_0^n$ estimated in step 120 with the image $I_0$ acquired by the image sensor 20 in step 100. The comparison may be expressed in the form of a difference or of a ratio, or of a squared deviation.

Step 140: computing a validity indicator from the comparison made, in step 130, for each spectral band. The validity indicator $\epsilon_{|\mathcal{F}^n}^n$ represents the relevance of the set $\mathcal{F}^n$ of vectors $F^n(r)$ describing the sample. The index $|\mathcal{F}^n$ means that the validity indicator is established for the set $\mathcal{F}^n$ of vectors $F^n(r)$. In this example, the validity indicator decreases as the set $\mathcal{F}$ describes the sample more correctly.

The validity indicator $\epsilon_{|\mathcal{F}^n}^n$ comprises an error criterion $\epsilon_{0|\mathcal{F}^n}^n$, the latter quantifying an overall error in the estimated image $\hat{I}_0^n$ with respect to the measured image $I_0$. By overall error, what is meant is an error for each radial position.

The error criterion $\epsilon_{0|\mathcal{F}^n}^n$ is established on the basis of the comparison of the images $\hat{I}_0^n$ and $I_0$. For example, $$\epsilon_{0|\mathcal{F}^n}^n = \frac{1}{N_r} \int dr \sum_\lambda \left( \frac{I_0(r) - \hat{I}_0^n(r)}{\sigma(\hat{I}_0^n(r))} \right)^2, \qquad (10)$$

where:

$N_r$ is the number of radial positions in question;

$\sigma$ is the standard-deviation operator, enabling a noise model to be taken into account.

The index $0|\mathcal{F}^n$ attributed to the error criterion $\epsilon_{0|\mathcal{F}^n}^n$ represents the fact that this indicator is computed in the detection plane $P_0$, with respect to the set $\mathcal{F}^n$ of vectors taken into account in the iteration.

The error criterion $\epsilon_{0|\mathcal{F}^n}^n$ is a data-consistency criterion, in the sense that its minimization allows the measured data, in the present case the image $I_0$, to be got closer to. Thus, when $\hat{I}_0^n$ tends toward $I_0$, i.e. when the set $\mathcal{F}^n$ of vectors correctly describes the sample 10, $\epsilon_{0|\mathcal{F}^n}^n$ tends toward 1. In step 150, a minimization algorithm, of gradient-descent type, may be applied so as to gradually approach, in each iteration, the set $\mathcal{F}^n$ allowing a satisfactory minimization of the validity indicator $\epsilon_{|\mathcal{F}^n}^n$. Thus, the objective of this step is to establish a set $\mathcal{F}^n$ of vectors $F^n(r)$ aiming to obtain, following a reiteration of steps 110 to 140, a validity indicator $\epsilon_{|\mathcal{F}^{n+1}}^{n+1}$ that is lower than the validity indicator $\epsilon_{|\mathcal{F}^n}^n$ of the current iteration n.

This step allows at least one term $F_w^n(r)$ of each vector $F^n(r)$ to be updated.

To do this, for each radial position r, a gradient $G_w^n(r)$ of the validity indicator $\epsilon_{|\mathcal{F}^n}^n$ with respect to the optical parameter corresponding to the term $F_w^n(r)$ is defined, such that:

$$G_w^n(r) = \frac{\partial \epsilon_{|\mathcal{F}^n}^n}{\partial F_w^n(r)} \qquad (11)$$

A gradient-descent algorithm then defines a direction $d_w^n$ and a step size of advance $\sigma_w^n$. The term $F_w(r)$ of each parameter vector is updated according to the expression:

$$F_w^{n+1}(r) = F_w^n(r) + d_w^n \sigma_w^n \qquad (12)$$

The validity indicator $\epsilon_{|\mathcal{F}^n}^n$ is a scalar variable. However, it depends on the set $\mathcal{F}^n$ of parameter vectors from which it was established, by way of the image $\hat{I}_0^n$ estimated in step 120.

The gradient $G_w^n(r)$ may be defined for each term $F_w^n(r)$ of the vectors $F^n(r)$ considered in the iteration of rank n.

According to a first embodiment, the validity indicator takes into account only the error criterion: $\epsilon_{|\mathcal{F}^n}^n = \epsilon_{0|\mathcal{F}^n}^n$.

In one variant, detailed below, the validity indicator also comprises a morphological criterion, allowing geometric or optical constraints on the sample or on the particles forming the sample to be taken into account.

Step 150: Updating the parameters of the sample, forming the vectors $F^n(r)$, by minimizing the validity indicator $\epsilon_{|\mathcal{F}^n}^n$. The parameters are updated by applying expression (12).

Step 160: new iteration of steps 120 to 150, taking into account, in step 120 of the following iteration (n+1), the set $\mathcal{F}^n$ updated in step 150 of the iteration carried out last.

Steps 120 to 160 are iterated until the value of the validity indicator $\epsilon_{|\mathcal{F}^n}^n$ is considered to be representative of a good description of the sample by the set $\mathcal{F}^n$ of vectors $F^n(r)$. N designates the rank of the last iteration.

Taking into account an indicator such as defined in equations (10) and (13), the iterations cease when the value of the validity indicator $\epsilon_{|\mathcal{F}^n}^n$ is sufficiently low, or when a preset number of iterations has been reached, or when the validity indicator no longer varies significantly between two successive iterations.

Following the last iteration, parameters $F^N(r)$ of the sample are obtained. However, when the phase of the exposure light wave 14 is dependent on some of the parameters, such as the optical path difference, an indeterminateness may remain, because of the periodicity described above.

FIG. 3B schematically shows such an indeterminateness. In this figure, it is assumed that only a single parameter L, corresponding to an optical path difference, is considered. The y-axis represents an indicator $\epsilon_{|L}$ dependent on the value of the parameter L (x-axis), this value corresponding to one radial position. The point A corresponds to a value of the parameter L estimated in a first iteration, after an initial image has been taken into account. The use of a gradient-descent algorithm leads to a minimization of the indicator $\epsilon_{|L}$ in the direction of point B, the latter corresponding to a local minimum. However, the graph shows that the minimum value of the indicator $\epsilon_{|L}$, which corresponds to the optimal reconstruction, is obtained at point C. Starting from point A, point C cannot be reached by a minimization algorithm of gradient-descent type. As a result of the above, the reconstruction quality depends on the initial image considered. In step 110, nothing is known beforehand about the properties of the sample. Thus, even if the iterations of steps 120 to 160 allow a reconstruction of good quality to be obtained, a new initialization, taking into account knowledge of the properties of the sample, may be necessary to achieve an optimal reconstruction. A new initialization may allow the gradient-descent algorithm to be started at a point D. It then becomes possible to reach the point C via gradient descent. This is the objective of steps 170 to 180 described below:

Step 170: updating all or some of the parameters of the sample using a supervised machine learning algorithm.

At the end of step 160, vectors of parameters $F^N(r)$ defined for each radial position r, and forming a set $\mathcal{F}^N$ of parameters, are obtained. Certain terms of these vectors, or even all the terms of these vectors, may be used as input data of a supervised machine learning algorithm. The set of parameters $\mathcal{F}^N$ contains R vectors $F^N(r)$, each vector containing W terms $F_w^N(r)$. R designates the number of radial positions in question. At each radial position r, certain ones of these terms, or even all the terms, may form the input data of the algorithm, as described below.

The machine learning algorithm may be a neural network, for example a convolutional neural network (CNN).

In this example, the neural network comprises two input layers IN. Each input layer represents a spatial distribution (or image) of a parameter $F_w^N$ describing the sample, such as updated in the last iteration of steps 120 to 160 preceding step 170. In this example, the first input layer represents a distribution of the first parameter $F_1^N(r)$, in the present case the absorbance $\alpha^N(r)$, in the sample plane, whereas the second input layer represents a distribution of the second parameter $F_2^N(r)$, in the present case the optical path difference $L^N(r)$, in the sample plane.

Generally, the algorithm is applied to at least one input layer IN, corresponding to a spatial distribution of a parameter $F_w^N$ of rank w in the sample plane, resulting from the last iteration n=N of steps 120 to 160. In the example in question, the two spatial distributions of the parameters $F_1^N$ and $F_2^N$ resulting from the last iteration N of steps 120 to 160 are used as input layers.

Between the input layers IN and the output layer OUT, the neural network comprises 20 layers L1, L2 . . . L20, the ranks of which are comprised between 1 (layer adjacent the layer IN) and 20 (layer adjacent the layer OUT). Each layer contains 20 planes. A layer is obtained by convoluting the 20 planes of the layer of preceding rank with a convolution kernel of 3×3 size. The layer IN is considered to be the layer of rank 0. The neural network may comprise one or more output layers OUT. Each output layer represents an image of a parameter, in the sample plane. In this example, the neural network comprises only a single output layer, corresponding to an image, called the output image, of the second parameter $F_2$, i.e. the optical path difference L, in the sample plane. The output image comprises parameters, called output parameters, that are updated by the algorithm.

FIG. 3C schematically shows an architecture of such a network.

Alternatively, it is possible to employ other neural-network architectures, or even supervised machine learning algorithms, for example a support-vector-machine (SVM) algorithm.

Following step 170, the following will have been obtained, for each radial position:
- parameters $F_w(r)$ not updated by the algorithm: it is a question, in this example, of the parameters of rank w=1, in the present case the absorbance $\alpha(r)$: they correspond to the parameters resulting from the last iteration of steps 120 to 160.
- parameters $F_w^\circ(r)$ updated by the CNN algorithm: it is a question, in this example, of the parameters of rank w=2, in the present case the optical path difference $L(r)$.

The index ° represents the fact that the parameters have been updated by the CNN algorithm.

According to one embodiment, the algorithm allows all of the parameters to be updated.

In this example, step 170 allows vectors F° (r) forming a set $\mathcal{F}^\circ$ of parameters updated by the algorithm to be generated.

The convolutional neural network (CNN) will have been trained beforehand, using well-characterized training data, as described below (see step 90).

Step 180: reiterating steps 120 to 160 taking into account the output parameters resulting from step 170 in order to form a complex initialization image. In this step, from the parameters of the sample resulting from step 170, the initialization image $A_{10}^{0,\circ}$ is updated. In this example, the initializaiton image $A_{10}^{0,\circ}$ is established, based on the values of $\alpha(r)$ and of $L^\circ(r)$ resulting from step 170, using expression (1).

The iterations of steps 120 to 160 are then reiterated. In the first step 140 of the reiteration, the initialization image $A_{10}^{0,\circ}$ resulting from step 180 is used. Following the iterations of steps 120 to 160:
- either it is considered that recourse to a neural network is necessary, in which case steps 170 and 180 are repeated, and a new reiteration of steps 120 to 160 is performed, using the image resulting from the algorithm as initialization image;
- or it is concluded that the parameters $\mathcal{F}^N$ resulting from the last step 150 correspond to a good representation of the sample, in which case the algorithm is exited, this corresponding to step 190 of exiting the algorithm. The parameters considered to be representative of the sample are then those corresponding to the last iteration N of steps 120 to 160: it is a question of the set $\mathcal{F}^N$ of vectors $F^N$ resulting from the last iteration.

Step 190: exiting the algorithm.

In this step, an image of a parameter is formed, this corresponding to a spatial distribution of the parameter in question. This allows a representation of the sample to be obtained. In this step, various images of various parameters may respectively be formed. In the described example, an image of the optical path difference and/or an image of the absorbance may be formed. These images may allow the sample to be characterized.

Thus, generally, the method comprises:
- a first series of iterations of steps 120 to 160, so as to obtain a set $\mathcal{F}^N$ of vectors $F^N$ containing the parameters characterizing the sample;
- following the first reiterations of steps 120 to 160, recourse to a supervised machine learning algorithm, and for example to the convolutional neural network described above, using all or some of the parameters characterizing the sample (step 170);
- using the sample parameters updated by the supervised machine learning algorithm, said parameters being used as initialization parameters for a second series of iterations of steps 120 to 160 (step 180);
- following the second series of iterations of steps 120 to 160, the supervised machine learning algorithm may once again be employed, prior to a third series of iterations of steps 120 to 160, etc.

Thus, it is possible to attribute a rank x to each series of iterations of steps 120 to 160. In the first series of iterations, x=1. The series of iterations of rank x allows a set of parameters $\mathcal{F}^{N,x}$ to be obtained. All or some of the parameters $\mathcal{F}^{N,x}$ may be updated by the machine learning algorithm, so as to obtain updated parameters $\mathcal{F}^{N,x,\circ}$. The latter form initialization parameters used in a series of iterations of rank x+1.

The last series of iterations, of rank X, of steps 120 to 160 allows parameters $\mathcal{F}^{N,X}$ to be obtained, the latter allowing at least one image of a parameter of the sample to be obtained (step 190). The image of the parameter of the sample, or each image of the parameter of the sample, may allow the sample to be characterized.

The number of series of iterations of steps 120 to 160 to be performed may be defined a priori, on the basis of calibrations using calibration samples considered to be comparable to the analyzed sample. The number of series of iterations of steps 120 to 160 may also be established case by case, for example by comparing the parameters resulting from two different series. Steps 170 and 180 are repeated as many times as the number of series of iterations of steps 120 to 160, minus 1.

One advantageous aspect of the invention is that the parameters resulting from the neural network are used, not to obtain a final representation of the sample, but to initialize a holographic reconstruction algorithm. This allows the performance associated with the use of machine learning to be exploited, while taking into account the measured data.

Use of the CNN algorithm employed in step 170 assumes a prior phase of training with known samples, for example digital samples obtained by simulation. The training samples must preferably be representative of the samples analyzed subsequently. The training is the subject of step 90.

Step 90: training.

Figure 4A:
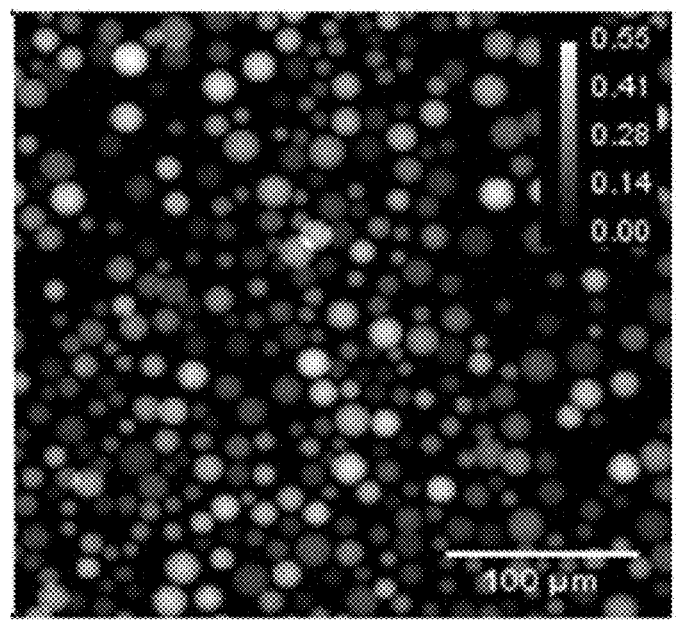

FIG. 4A shows one portion of an example of a digital sample, obtained by simulating spheres. The inventors have simulated 4000 spheres lying in the field of observation of the image sensor, i.e. in a field of about 3 mm². These spheres are considered to be representative of cells. The radii of the spheres are randomly chosen between 4 µm and 10 µm. Their refractive index difference L(r), with respect to the medium in which the spheres bathe, is randomly chosen between 0.01 and 0.05. The distribution of the spheres is random. The simulation allows grouped together spheres to be simulated. The training is also performed while taking into account a distance, between the sample and the image sensor, preferably corresponding to the distance considered during the trials on the real samples.

The inventors have simulated 1000 samples: they have thus established images of absorbance and of optical path difference for the 1000 simulated samples. Each image extends over 1000×1000 pixels. FIG. 4A is an extract from an image of optical path difference. The grayscale corresponds to the value of the optical path difference for each pixel.

Figure 4B:
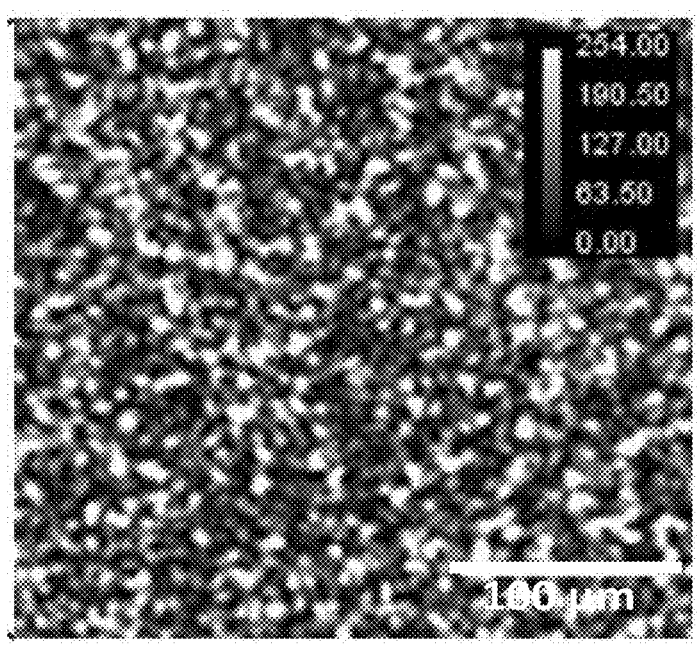

For each image, representing a spatial distribution of the parameters of the sample in the sample plane, images acquired by the image sensor were simulated using a model such as described with reference to expression (5). FIG. 4B corresponds to a simulation of the image (hologram) acquired by the image sensor, from FIG. 4A. The application of the model assumes that the following are known:
- a distance between the sample and the image sensor, in the present case 1270 µm;
- an illumination spectral band, in the present case centered on 450 nm and of spectral width equal to 15 nm;
- a diameter of the light source, in the present case 50 µm;
- a distance between the sample and the image sensor, in the present case 50 mm.

Figure 4C:
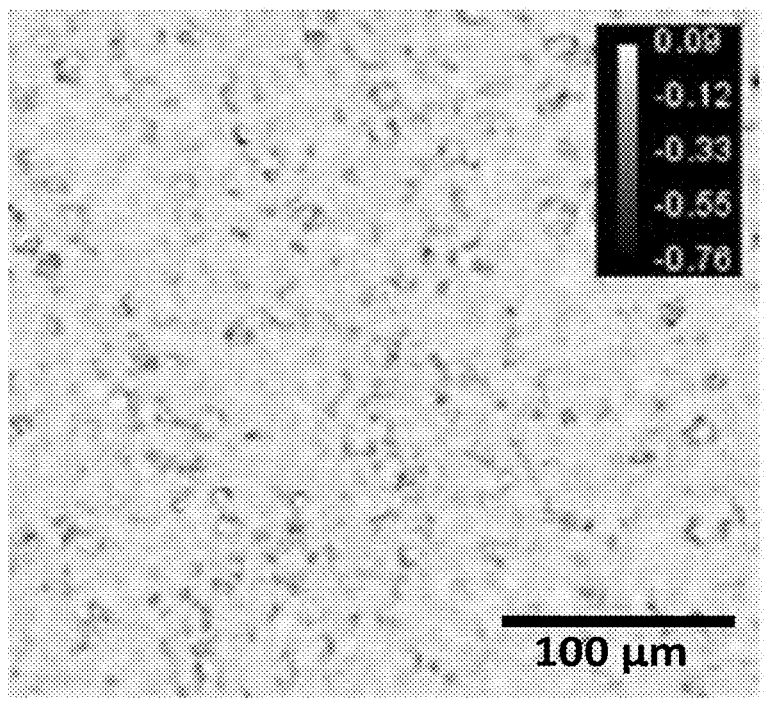
Figure 4D:
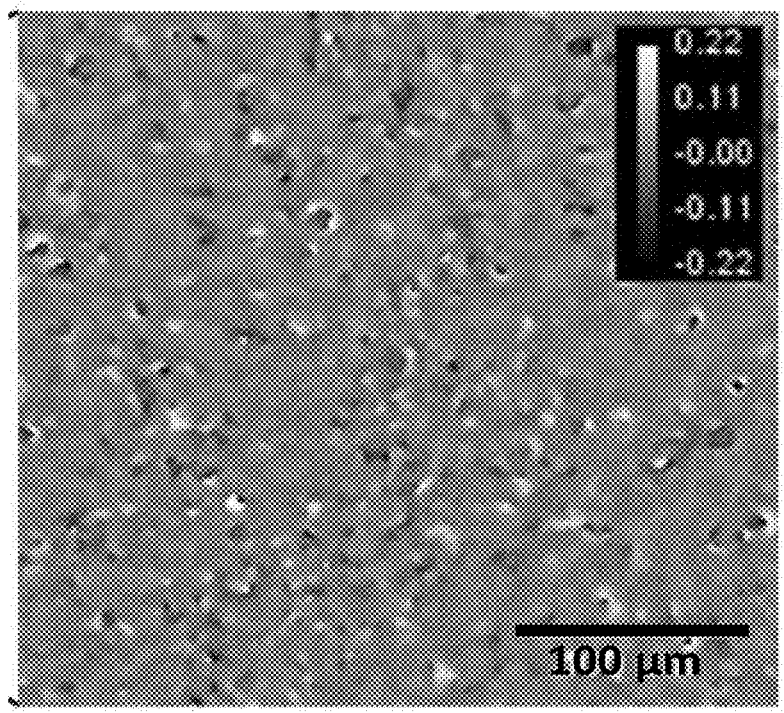

To each simulation of an image acquired by the image sensor, an iterative reconstruction algorithm, such as described with reference to steps 120 to 160, was applied so as to obtain complex images of training samples, in the sample plane. From the reconstructed complex images, an image of each parameter in the sample plane was obtained. FIGS. 4C and 4D are, respectively, images of the absorbance α(r) and of the optical path difference L(r) resulting from application of the iterative reconstruction algorithm to FIG. 4B.

Considering the 1000 digital samples simulated and, for each simulated sample, one reconstructed image of the absorbance and one reconstructed image of the optical path difference, a total of 2000 reconstructed images, such as those shown in FIGS. 4C and 4D, were obtained. From these images, the following were randomly extracted:
- 10 000 thumbnails of 121×121 size representing the absorbance, one example of which is given in FIG. 4E: it is a question of absorbances estimated by the iterations of steps 120 to 160.
- 10 000 thumbnails of 121×121 size representing the optical path, one example of which is given in FIG. 4F: it is a question of optical path differences estimated by the iterations of steps 120 to 160.

These thumbnails were used as input data for training the convolutional neural network.

From the simulated parameters, such as shown in FIG. 4A, 10 000 thumbnails, of 121×121 size, corresponding to the true optical path differences, were extracted, these thumbnails being used as output data for training the neural network. An example is given in FIG. 4G.

Figure 4E:
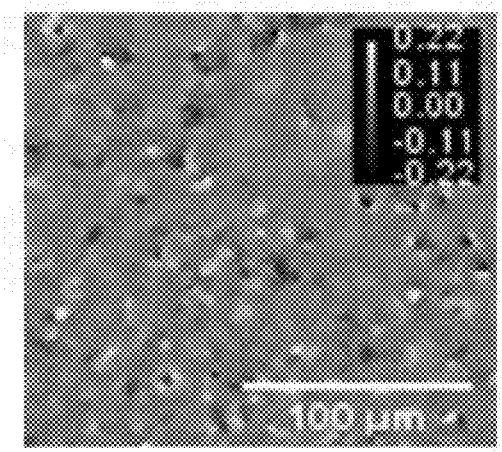
Figure 4F:
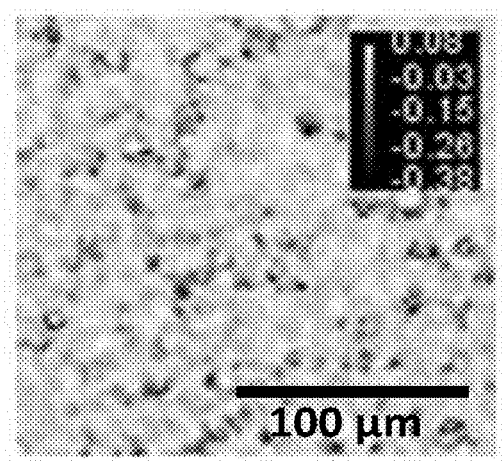
Figure 4G:
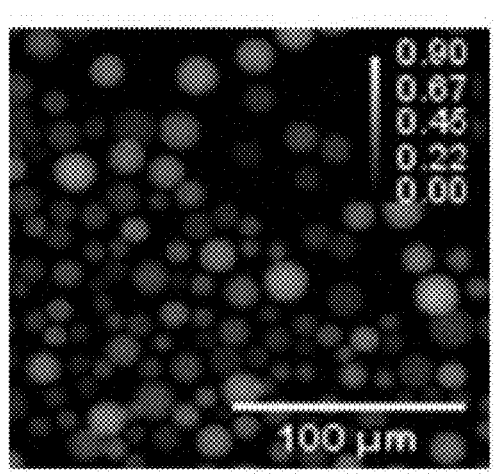

FIGS. 4E, 4F and 4G correspond to the same portion of a digital sample. They form a training set (2 inputs, 1 output). 10 000 training sets, such as shown in FIGS. 4E to 4G, have been formed. The training sets have been used to parameterize the convolutional neural network such as described with reference to FIG. 3C.

Variant

According to one variant, the validity indicator also comprises a morphological criterion, allowing geometric or optical constraints on the sample or particles forming the sample to be taken into account. The validity indicator $\epsilon_{|\mathcal{F}^n}^n$ also takes into account a morphological criterion $\epsilon_{10|\mathcal{F}^n}^n$. Unlike the error criterion $\epsilon_{0|\mathcal{F}^n}^n$, which is defined on the basis of data measured or estimated in the detection plane $P_0$, the morphological criterion $\epsilon_{10|\mathcal{F}^n}^n$ is defined in the plane $P_{10}$ of the sample.

Generally, the morphological criterion $\epsilon_{10|\mathcal{F}^n}^n$ depends on the value of the terms of the vectors of parameters determined in step 110 or in step 150 of a preceding iteration, or of their spatial derivatives. It is representative of the morphology of the sample, such as determined from the vectors of parameters. In other words, the morphological criterion is a criterion enabling consistency to be achieved with morphological data of the sample, the latter possibly being defined by hypotheses.

The morphological criterion $\epsilon_{10|\mathcal{F}^n}^n$ may take into account a spatial derivative of the optical path difference, so as to take into account a predefined shape of a particle. For example, when the sample contains adherent cells, the predefined shape may be a hemisphere, such a particular case being shown in FIG. 2. When the sample contains floating cells, the predefined shape may be a sphere when the cells are spherical.

For example, if the complex amplitude of the exposure light wave 14 is defined using expression (1), each parameter vector contains a term $L^n(r)$ and an example of a morphological criterion is:

$$\epsilon_{10|\mathcal{F}^n}^n = \int dr \sqrt{\left(\frac{\partial L^n(r)}{\partial x}\right)^2 + \left(\frac{\partial L^n(r)}{\partial y}\right)^2} \qquad (11)$$

This criterion tends to decrease when the quantity $L^n(r)$ exhibits a minimum of oscillations, this being the case for example when the particles have a spherical or hemispherical particle morphology. The values of $L^n(r)$ for which the criterion is minimal therefore correspond to particles, for example spherical or hemispherical particles, that are isolated from one another, with a minimum of oscillation of $L^n(r)$ between the particles or on the latter.

The morphological criterion $\epsilon_{10|\mathcal{F}^n}^n$ is minimal when the vectors of parameters $F^n(r)$ forming the set $\mathcal{F}^n$ describe objects meeting morphological hypotheses established beforehand.

When the validity indicator $\mathcal{F}$ takes into account the morphological criterion $\epsilon_{0|\mathcal{F}^n}^n$, it may be defined in the form of a weighted sum of the error criterion $\epsilon_{0|\mathcal{F}^n}^n$ and of the morphological criterion $\epsilon_{10|\mathcal{F}^n}^n$. The expression of the validity indicator may then be, for example:

$$\epsilon_{|\mathcal{F}^n}^n = \epsilon_{0|\mathcal{F}^n}^n + \gamma\, \epsilon_{10|\mathcal{F}^n}^n \qquad (12)$$

where γ is a positive scalar.

Application of the Method to Real Data.

The method described with reference to steps 100 to 190 has been implemented using a sample containing floating Chinese-hamster-ovary (CHO) cells. The cells bathed in a culture medium, in a fluidic chamber of 20 µm thickness.

Figure 5A:
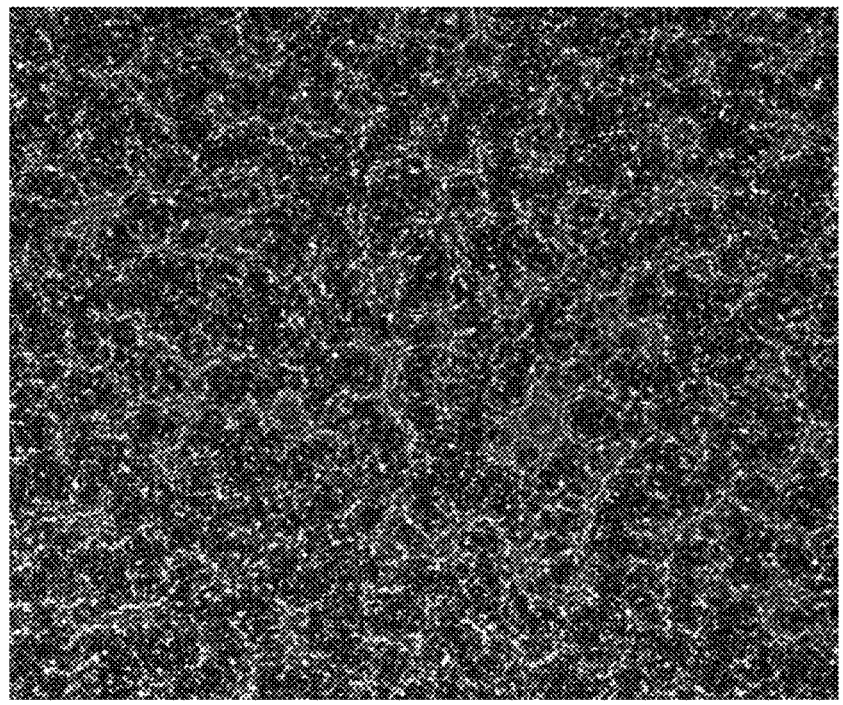
Figure 5B:
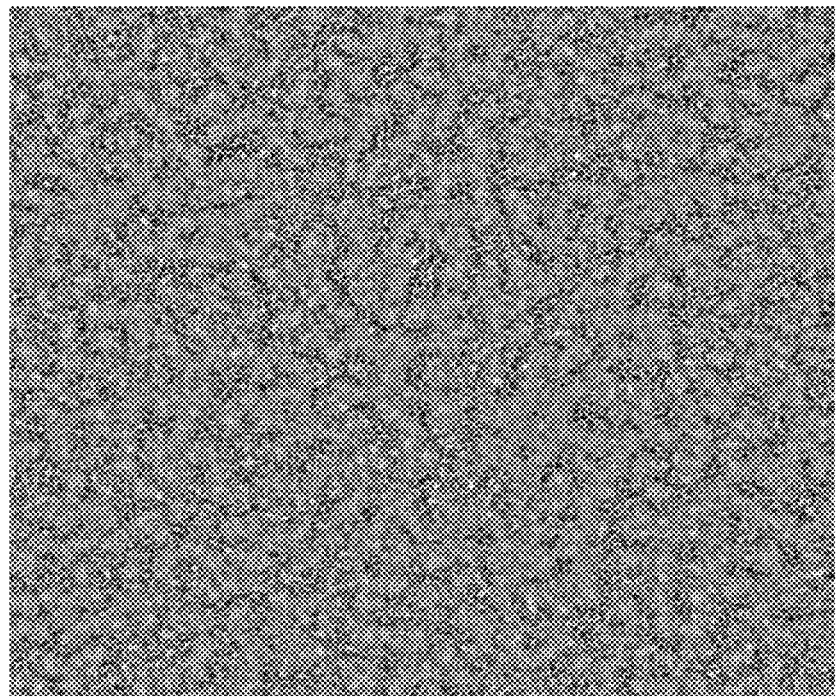

The light source was a light-emitting diode, the emission spectral band of which was centered on 450 nm, and which was filtered by a diaphragm of 50 µm. The image sensor was a monochromatic sensor comprising 3240×2748 pixels of 1.67 µm side length. FIG. 5A shows one obtained hologram, i.e. one image acquired by the image sensor. FIG. 5B shows an image of the second parameter L(r) resulting from a plurality of iterations of steps 120 to 160. These iterations allow an image of the parameters α(r) and L(r) to be obtained.

Figure 5C:
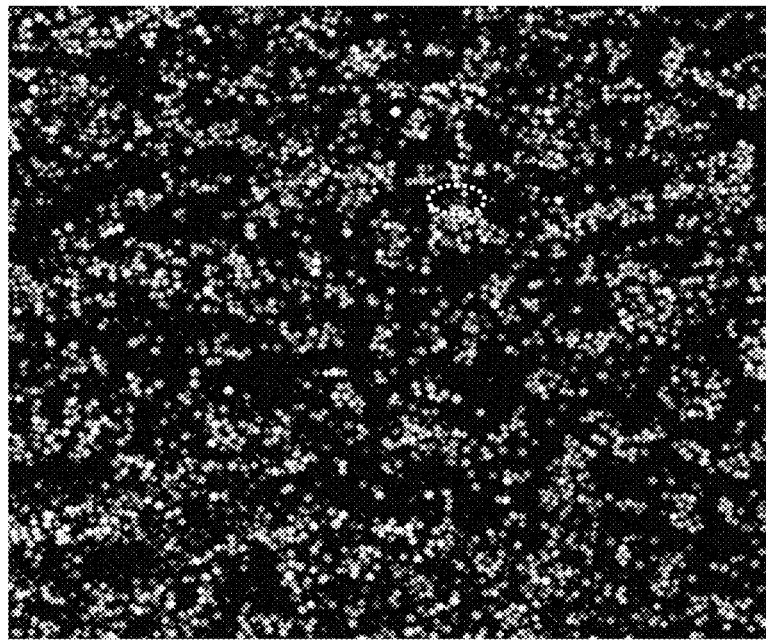

FIG. 5C shows an image obtained by applying a neural network to the images of the parameters α(r) and L(r). FIG. 5C shows an output image of the neural network, corresponding to an image of the parameter L°(r). Comparison of FIGS. 5B and 5C shows that the neural network makes very significant adjustments, certain ones thereof being encircled by a dotted circle. It has been observed that the most significant adjustments are made following the first iterations of steps 120 to 160. It may for example be seen that dark pixels in FIG. 5B appear in the form of light pixels in FIG. 5C.

The image L°(r) of FIG. 5C and the image of the parameter α(r) were used to establish a complex initialization image $A_{10}^{0,\circ}$ according to expression (1). Based on this initialization image, the steps of iterative reconstruction, described with reference to steps 120 to 160, were reiterated.

Figure 5D:
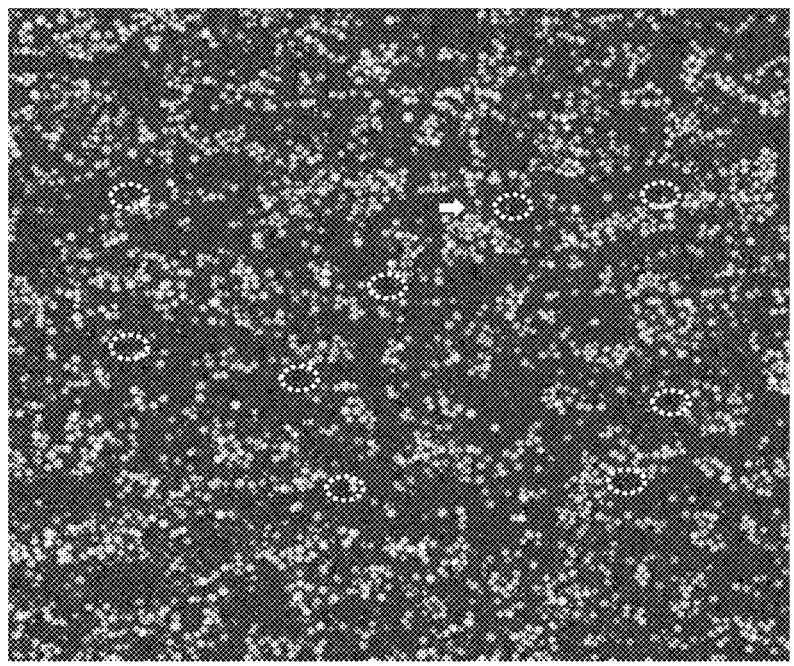

FIG. 5D shows an image of the parameter L(r) following a reiteration of steps 120 to 160. Modifications with respect to the image of the parameter L°(r) shown in FIG. 5C, which image was the result of implementation of the neural network, may be seen: the reconstruction allows objects not detected in the preceding images (dotted lines) to be identified. It also allows certain objects detected by the neural network to be removed, said objects being indicated (white arrows). The fact of applying an iterative second reconstruction, based on the image of FIG. 5C, allows the precision with which the image of the parameter L(r) is established to be refined.

Figure 5E:
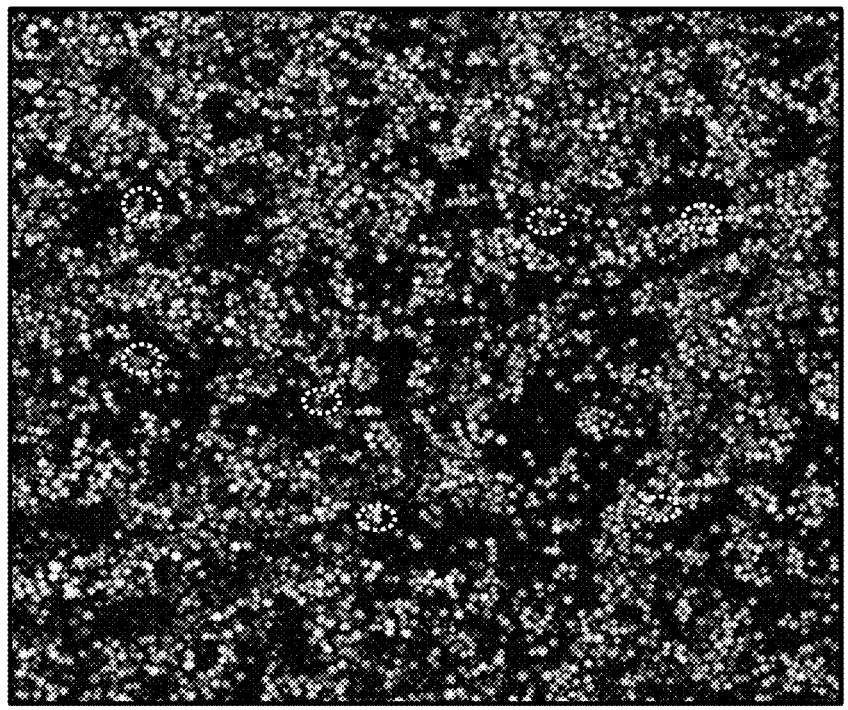
Figure 5F:
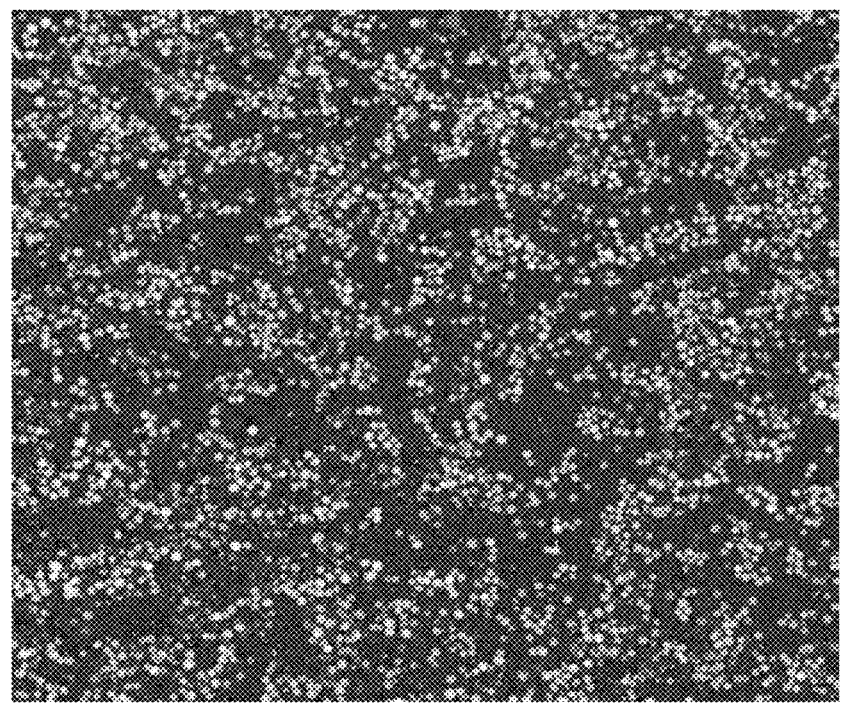

The reiteration of steps 120 to 160 allowed second images of the parameters α(r) and L(r) to be defined. These images were used as input images of the convolutional neural network. FIG. 5E shows the output image (L°(r) of the neural network, representing an update of the image of the parameter L(r). The new objects, issued from the iterative reconstruction, are confirmed in this image (dotted lines). The image of the parameter L°(r) of FIG. 5E and the image of the parameter α(r) were used to establish a complex initialization image $A_{10}^{0,\circ}$, according to expression (1). Based on this initialization image, the steps of iterative reconstruction, described with reference to steps 120 to 160, were reiterated again. FIG. 5F shows an image of the parameter L(r) following this new reiteration of steps 120 to 160.

Figure 6A:
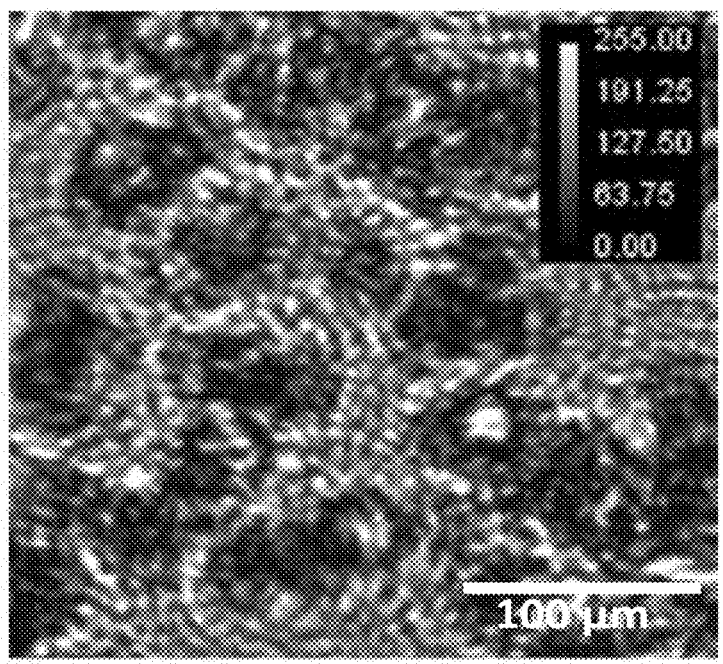
Figure 6B:
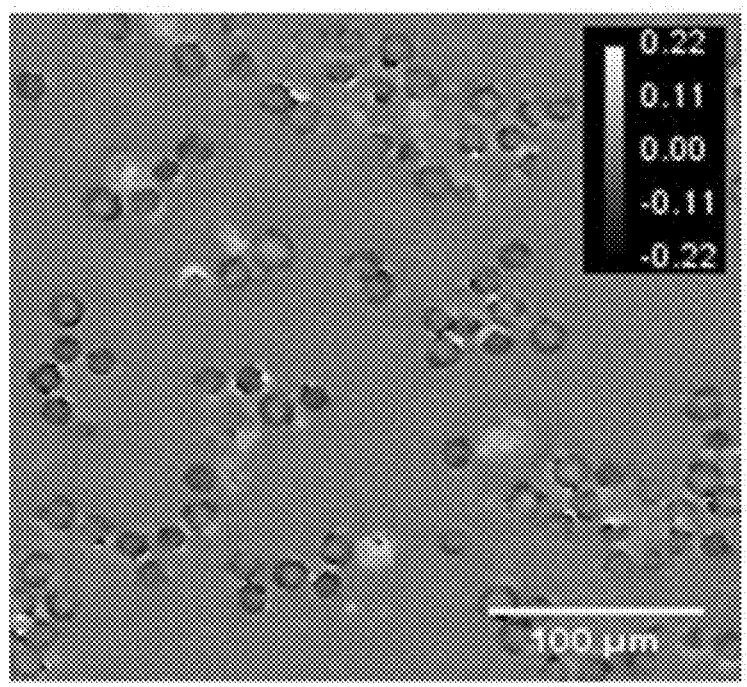
Figure 6C:
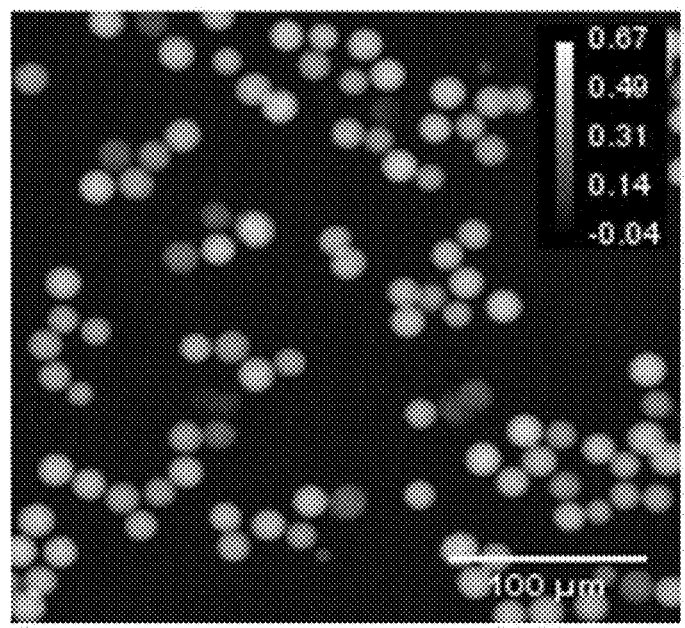
Figure 6D:
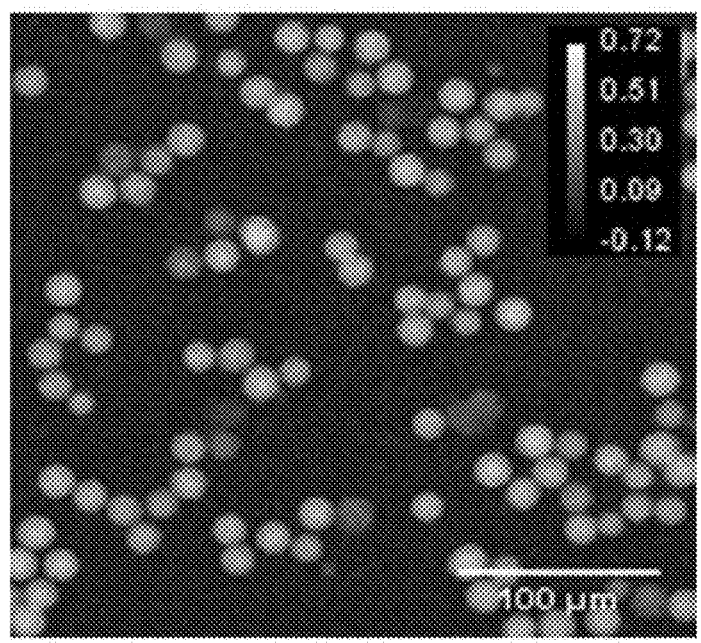

FIGS. 6A to 6D show a second series of trials on floating Chinese-hamster-ovary (CHO) cells, having a different density than in the trial described with reference to steps 5A to 5F. FIG. 6A shows one portion of an image acquired by the image sensor. FIG. 6B shows an image of the optical path difference L(r) estimated after first iterations of steps 120 to 160. Phase aliasing, which corresponds to dark grayscales next to certain cells, is observed. The images of the absorbance and of the optical path difference, resulting from the last iteration of steps 120 to 160, have been used as input images of the convolutional neural network (step 170). The image of FIG. 6C corresponds to an image of the optical path difference, resulting from the neural network: by comparing FIGS. 6B and 6C, it may be seen that the effect of phase aliasing has been corrected by the neural network. The absorbance image, resulting from steps 120 to 160, and the image of the optical path difference shown in FIG. 6C, have been used to form a complex initialization image. The latter was used in a new implementation of steps 120 to 160. FIG. 6D shows an image of the optical path difference resulting from this new iteration.

In a third series of trials, a sample containing adherent PC12 cells in a culture medium was used. Another neural network was used, the training of which was based on models of samples containing adherent cells.

The source used was an LED emitting in a spectral band centered on 605 nm, and of spectral width equal to 20 nm. The sample was placed at a distance of 3500 μm. FIG. 7A shows an image of the optical path difference L(r) obtained following first iterations of steps 120 to 160. The resulting first parameters α(r) and second parameters L(r) obtained following the first iterations of steps 120 to 160 were used as input data of the convolutional neural network. FIG. 7B shows the output image of the second parameter L°(r), such as delivered by the neural network. Comparison of images 7A and 7B allows the effect of the convolutional neural network to be appreciated. The updated second parameters were used to form a complex initialization image, the latter being used for a second implementation of steps 120 to 160. FIG. 7C shows the image resulting from the reconstruction. This image shows a more continuous spatial variation in the parameter L(r) without the discontinuities that appear in FIG. 7A and that are representative of the phase-aliasing effect.

The method described above may allow the sample to characterized, on the basis of the parameters determined subsequent to step 180. By characterized, what is notably meant is, non-exhaustively:
- obtaining an image of the sample allowing the latter to be observed;
- determining the number of particles from which the sample is composed;
- classifying particles into classes of particles;
- counting particles;
- identifying particles with respect to identification parameters;
- counting identified particles;
- estimating geometrical characteristics of the sample;
- estimating geometric or optic characteristics of particles from which the sample is composed;
- determining the viability of the sample;
- estimating a dry mass content in the sample, and for example of one or more particles of the sample.

The invention will possibly be applied to biological samples, in the health field, for example to assist with diagnostics, or in the study of biological processes. It may also be applied to samples sampled from the environment, or from industrial installations, for example in the food-processing field.

The invention claimed is:

1. A method for observing a sample, the sample lying in a sample plane defining radial positions, parameters of the sample being defined at each radial position, the method comprising:
   a) illuminating the sample using a light source, the light source emitting an incident light wave that propagates toward the sample;
   b) acquiring, with an image sensor, an image of the sample, said image being formed in a detection plane, the sample being placed between the light source and the image sensor;
   c) from the image acquired by the image sensor, obtaining an image of the sample, in the sample plane, the image of the sample in the sample plane corresponding to a distribution of at least one parameter of the sample in the sample plane;

wherein c) comprises:
- (i) taking into account an initialization image, in the sample plane;
- (ii) applying a holographic propagation operator to the initialization image, or to a complex image of the sample resulting from (v) of a preceding iteration, so as to provide an estimated image, the estimated image being an estimation of the image acquired by the image sensor in the detection plane;
- (iii) comparing the image acquired in b) and the image estimated in (ii);
- (iv) depending on the comparison, updating the parameters of the sample;
- (v) provided that a convergence criterion has not been met or a preset number of iterations has not been reached, updating a complex image of the sample, in the sample plane, using the parameters of the sample updated in (iv), then reiterating (ii) to (v);
- (vi) using the parameters of the sample, resulting from the last step (iv) performed, to feed a supervised machine learning algorithm, so as to update parameters of the sample;
- (vii) using updated parameters of the sample resulting from (vi) to update the initialization image;
- (viii) reiterating, at least once, steps (ii) to (v), using, during the first reiteration, the updated initialization image resulting from (vii);
- (ix) obtaining an image of the sample from the parameters of the sample updated in step (iv) of the last iteration of steps (ii) to (v).

2. The method of claim 1, wherein (iv) comprises computing a validity indicator, such that the parameters of the sample are updated to make the validity indicator tend toward a preset value.

3. The method of claim 2, wherein, in (iv), the parameters of the sample are updated so as to minimize the validity indicator.

4. The method of claim 1, wherein the supervised machine learning algorithm comprises a neural network.

5. The method of claim 4, wherein the neural network is a convolutional neural network.

6. The method of claim 2, wherein (iv) comprises determining a gradient of the validity indicator as a function of at least one parameter of the sample, such that the parameters of the sample are updated to decrease the validity indicator of the following iteration.

7. The method of claim 6, wherein (iv) employs a gradient descent algorithm.

8. The method of claim 1, wherein:
- (iv) results in the determination of an image of each parameter of the sample in the sample plane;
- in (vi), at least one image of a parameter of the sample forms an input layer of the supervised machine learning algorithm;
- in (viii), the supervised machine learning algorithm delivers an output image, corresponding to an image of a parameter of the sample updated by the algorithm.

9. The method of claim 1, wherein, in (ii), the estimation of the image of the sample in the detection plane comprises a convolution with a convolution kernel, the convolution kernel representing a spatial extent of the light source.

10. The method of claim 1, wherein the parameters of the sample comprise:
- a first parameter of the sample representing an absorbance of the sample;
- a second parameter of the sample, representing an optical path difference, along the propagation axis of the incident light wave.

11. The method of claim 10, wherein, in step (vi), the supervised machine learning algorithm is fed with:
- an image of the first parameter of the sample, corresponding to a spatial distribution of the first parameter of the sample, which is updated in the last iteration of steps (ii) to (v) preceding step (vi);
- an image of the second parameter of the sample, corresponding to a spatial distribution of the second parameter of the sample, which is updated in the last iteration of steps (ii) to (v) preceding step (vi);
- and wherein the supervised machine learning algorithm allows an image of the updated second parameter of the sample to be obtained.

12. The method of claim 1, wherein, following a step (viii), steps (vi) to (viii) are repeated at least once.

13. The method of claim 1, wherein no image-forming optics are placed between the sample and the image sensor.

14. The method of claim 1, wherein an optical system, comprising a lens or objective, is placed between the sample and the image sensor, the optical system defining an image plane and an object plane, the method being such that, in b):
- the object plane is offset from the sample plane by an object defocus distance;
- and/or the image plane is offset from the detection plane by an image defocus distance.

15. A device for observing a sample, comprising:
- a light source, configured to emit an incident light wave in order to illuminate the sample;
- a sample holder, configured to receive the sample;
- an image sensor, configured to acquire an image of the sample when the sample is placed on the sample holder;
- a processor, programmed to execute instructions allowing steps i) to ix) of a method of claim 1 to be implemented on the basis of an image acquired by the image sensor.

* * * * *